(12) United States Patent
Wu

(10) Patent No.: US 10,677,060 B2
(45) Date of Patent: Jun. 9, 2020

(54) PNEUMATIC MOTOR WITH DUAL AIR INTAKE

(71) Applicant: Yu-Jen Wu, Taichung (TW)

(72) Inventor: Yu-Jen Wu, Taichung (TW)

( * ) Notice: Subject to any disclaimer, the term of this patent is extended or adjusted under 35 U.S.C. 154(b) by 257 days.

(21) Appl. No.: 15/871,539

(22) Filed: Jan. 15, 2018

(65) Prior Publication Data
US 2018/0209272 A1    Jul. 26, 2018

(30) Foreign Application Priority Data

Jan. 20, 2017   (TW) ................................ 10620155 A

(51) Int. Cl.
| | | |
|---|---|---|
| *F01C 21/10* | (2006.01) | |
| *F03C 2/00* | (2006.01) | |
| *F03C 4/00* | (2006.01) | |
| *F04C 15/00* | (2006.01) | |
| *F01C 21/18* | (2006.01) | |
| *F01C 1/344* | (2006.01) | |
| *F01C 13/02* | (2006.01) | |
| *F01C 21/08* | (2006.01) | |
| *B23B 45/04* | (2006.01) | |
| *B25D 9/12* | (2006.01) | |

(52) U.S. Cl.
CPC ............ *F01C 21/18* (2013.01); *F01C 1/3446* (2013.01); *F01C 13/02* (2013.01); *F01C 21/0809* (2013.01); *F01C 21/0854* (2013.01); *F01C 21/10* (2013.01); *B23B 45/044* (2013.01); *B25D 9/12* (2013.01)

(58) Field of Classification Search
CPC ....... B23B 45/044; B25D 9/12; F01C 1/3442; F01C 1/3446; F01C 13/02; F01C 21/0809; F01C 21/0836; F01C 21/0854; F01C 21/10; F01C 21/18; F04C 2/344; F04C 2/3446; F04C 15/06; F04C 23/008; F04C 29/122; F04C 2210/1005
USPC ........ 418/15, 75, 79–81, 259, 266–268, 270
See application file for complete search history.

(56) References Cited

U.S. PATENT DOCUMENTS

| | | | | |
|---|---|---|---|---|
| 3,238,848 | A * | 3/1966 | Bent .................. | F01C 21/0863 418/268 |
| 3,741,314 | A * | 6/1973 | Leoni ................. | B25B 21/02 173/93.6 |
| 6,217,306 | B1 * | 4/2001 | Seward ............... | F01C 13/02 418/270 |

(Continued)

*Primary Examiner* — Theresa Trieu
(74) *Attorney, Agent, or Firm* — Muncy, Geissler, Olds & Lowe, P.C.

(57) ABSTRACT

A pneumatic motor with dual air intake includes a pneumatic cylinder and a rotor. The pneumatic cylinder includes a cylinder body, and an elliptic-cylinder-shaped accommodating room located in the cylinder body. The cylinder body has two air inletting paths, two air venting paths, two air venting holes and a front axial hole, which communicate with the accommodating room and outside. The rotor includes a rotor body rotatably accommodated in the accommodating room of the pneumatic cylinder, a plurality of grooves parallel provided on the rotor body, a plurality of vanes accommodated in the grooves respectively, and a front axle extended from the rotor body and inserted through the front axial hole. As a result, the pneumatic motor with dual air intake is lowered in friction of the rotor when it rotates, raised in power output, and lowered in vibration when in use.

4 Claims, 10 Drawing Sheets

(56) References Cited

U.S. PATENT DOCUMENTS 6,250,399 B1    6/2001  Giardino
7,222,680 B2 *  5/2007  Livingston ................ B25F 5/00
                                                  173/168

* cited by examiner

PNEUMATIC MOTOR WITH DUAL AIR INTAKE

BACKGROUND OF THE INVENTION

1. Field of the Invention

The present invention relates to pneumatic motors and more particularly, to a pneumatic motor with dual air intake.

2. Description of the Related Art

The pneumatic tool is referred to the tool having a pneumatic motor which outputs kinetic energy through being driven by compressed air. The pneumatic motor with vanes presently applied in the pneumatic tools primarily has a pneumatic cylinder with an accommodating room, and a rotor pivotably disposed in the accommodating room. The main body of the rotor is provided on the periphery thereof with a plurality of retractable vanes. When air with high pressure is guided into the pneumatic cylinder, it can push the extended-out vanes to move, so that the rotor is driven to rotate, thereby providing the necessary rotary power for external works.

Presently the available products rely mainly on the pneumatic motor with single air intake, however, which vibrates relatively more intensely when in use. Therefore, the pneumatic motor with dual air intake is enveloped in the industry, intending to solve the vibration problem and raising the power output. For example, U.S. Pat. No. 6,250,399 disclosed a pneumatic motor with dual air intake. As shown in FIG. 9 of the aforesaid patent, the pressure chambers 19A, 19B are located by two sides of the rotor 50 and approximately crescent-shaped. Because of the configuration design of the two pressure chambers 19A, 19B, when the rotor 50 rotates, the vanes 54 are extended out fast from the radially extending slots 52, approximately maintained at the extremely extended condition for a while, and then retracted back fast. Because of such stroke design, after the motor is used for a long time, the vanes 54 will be worn down by the inner walls of the radially extending slots 52. Besides, the friction applied on the vanes 54 lovers the rotary speed of the rotor 50, thereby infecting the power output of the pneumatic motor, and even causing vibration problem when in use. In theory compared with the pneumatic motor with single air intake, the pneumatic motor with dual air intake should be larger power output and less in vibration. However, they are actually not quite different. Therefore, how to solve the vibration problem of the pneumatic motor with dual air intake and raise the power output of that is a development subject wherein the industry puts effort.

SUMMARY OF THE INVENTION

The present invention has been accomplished in view of the above-noted circumstances. It is an objective of the present invention to provide a pneumatic motor with dual air intake, which is lowered in friction applied on the rotor when the rotor rotates, raised in power output of the pneumatic motor, and lowered in vibration when in use.

To attain the above objective, the present invention provides a pneumatic motor with dual air intake, which includes a pneumatic cylinder and a rotor. The pneumatic cylinder includes a cylinder body, and an elliptic-cylinder-shaped accommodating room located in the cylinder body. The cylinder body has two air inletting paths, two air venting paths, two air venting holes and a front axial hole, which communicate with the accommodating room and outside. The rotor includes a rotor body rotatably accommodated in the accommodating room of the pneumatic cylinder, a plurality of grooves parallel provided on the rotor body, a plurality of vanes accommodated in the grooves respectively and a front axle extended from the rotor body and inserted through the front axial hole.

When air with high pressure is guided into the pneumatic cylinder, it can cause the vanes to be extended out from the grooves, and also push the extended-out vanes to move, thereby driving the rotor to rotate. Because the accommodating room in the cylinder body is elliptic-cylinder-shaped, i.e. the cross section thereof is ellipse-shaped, it can ease up the condition that the vanes are extended out fast and retracted back fast, not only effectively lowering the friction between the vanes and the grooves, but also lowering the vibration when in use, meanwhile raising the power output.

DETAILED DESCRIPTION OF THE INVENTION

Figure 1:
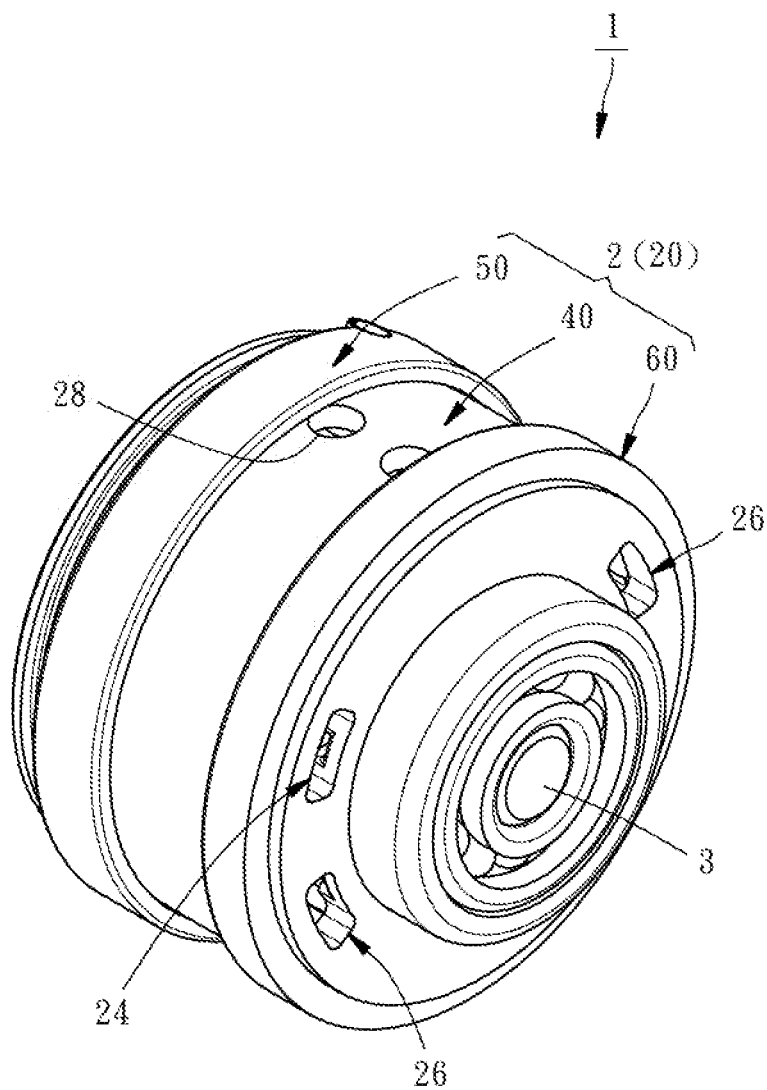
FIG. 1 is an assembled perspective view of a pneumatic motor with dual air intake according to a first preferred embodiment of the present invention.
Figure 2:
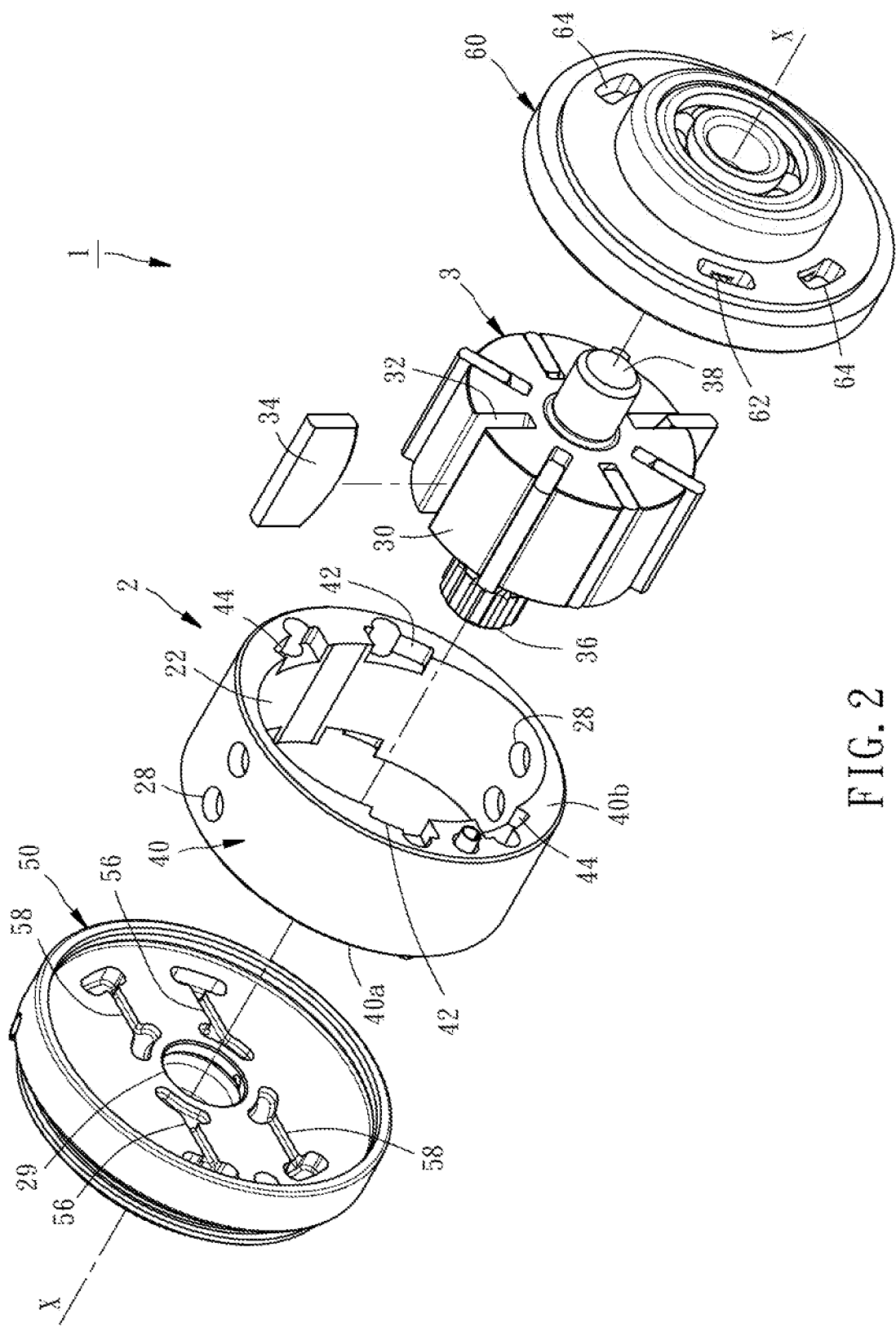
FIG. 2 is an exploded perspective view of the pneumatic motor with dual air intake according to the first preferred embodiment of the present invention.

Referring to FIGS. 1-2, a pneumatic motor 1 with dual air intake according to a first preferred embodiment of the present invention (hereinafter referred to as motor 1) includes a pneumatic cylinder 2 and a rotor 3. The motor 1 can be applied to various kinds of pneumatic tools, such as pneumatic wrench, pneumatic winder, pneumatic screw driver, and so on. In the following illustration of the present invention, the rear of the motor 1 is defined on the right side of the motor 1 shown in FIGS. 1-2, and the front of the motor 1 is defined on the left side of the motor 1 shown in FIGS. 1-2.

Figure 6:
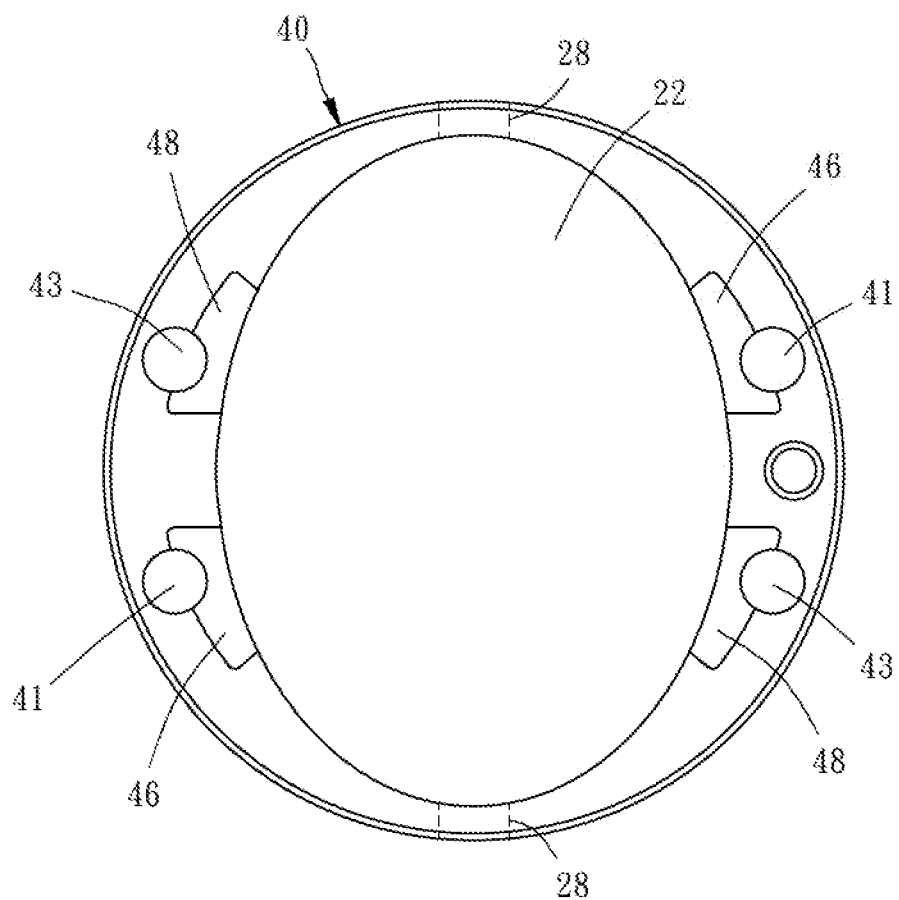
FIG. 6 is a front view of the middle pipe according to the first preferred embodiment of the present invention.

The pneumatic cylinder 2 includes a cylinder body 20, and an elliptic-cylinder-shaped accommodating room 22 located in the cylinder body 20, which means the cross section of the accommodating room 22 is ellipse-shaped as shown in FIG. 6. The cylinder body 20 has two air inletting paths 24, two air venting paths 26, four air venting holes 28 and a front axial hole 29, which communicate with the accommodating room 22 and outside. Said outside is referred to the space outside the motor 1. Specifically speaking, the cylinder body 20 includes a middle pipe 40, a front cover 50 disposed on a front end 40a of the middle pipe 40, and a rear cover 60 disposed on a rear end 40b of the middle pipe 40. The front axial hole 29 is provided on the front cover 50. The four air venting holes 28 are provided on the top and bottom sides of the middle pipe 40. In other potential embodiments, the amount of the air venting holes 28 may be two or more than two.

Figure 3:
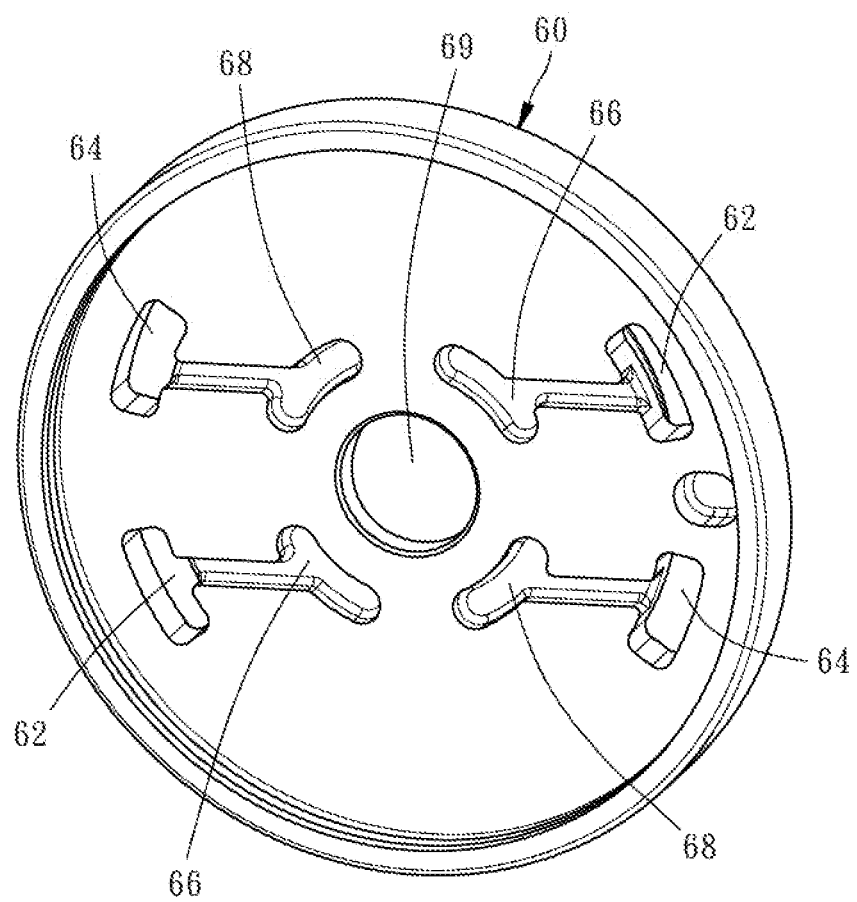
FIG. 3 is a perspective view of a rear cover according to the first preferred embodiment of the present invention.
Figure 4:
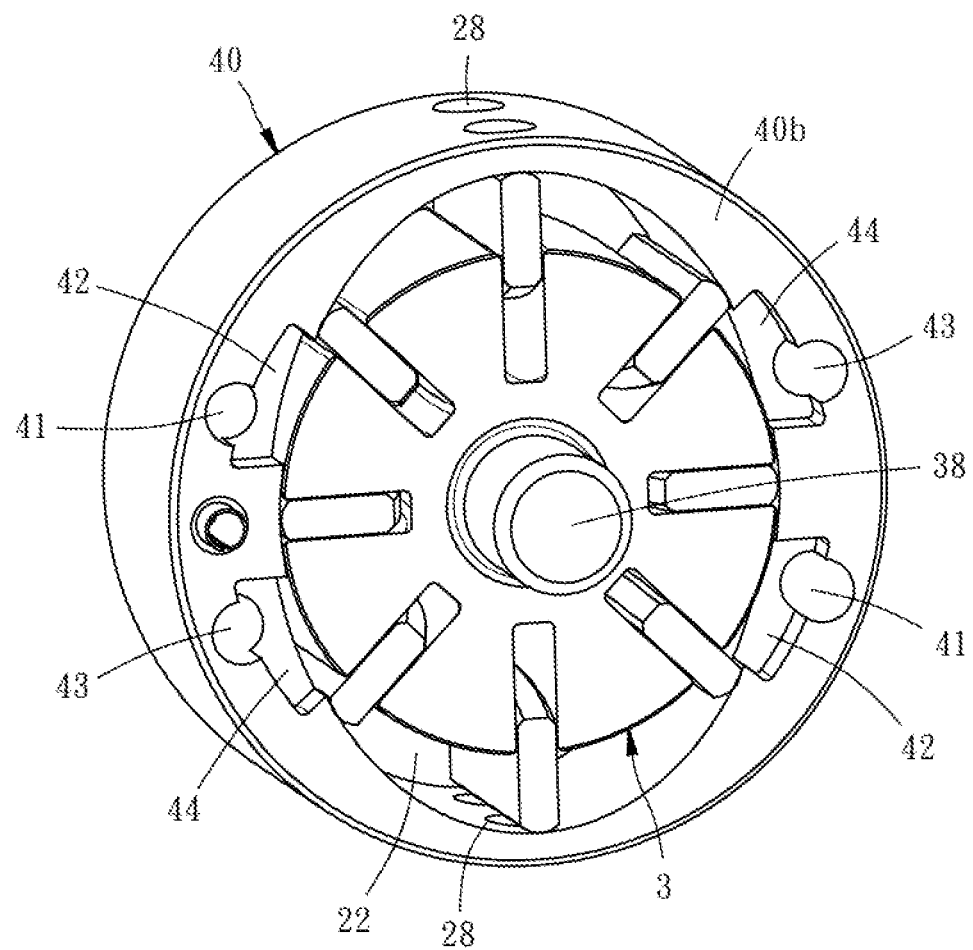
FIGS. 4-5 are assembled perspective views of a middle pipe and a rotor according to the first preferred embodiment of the present invention.
Figure 5:
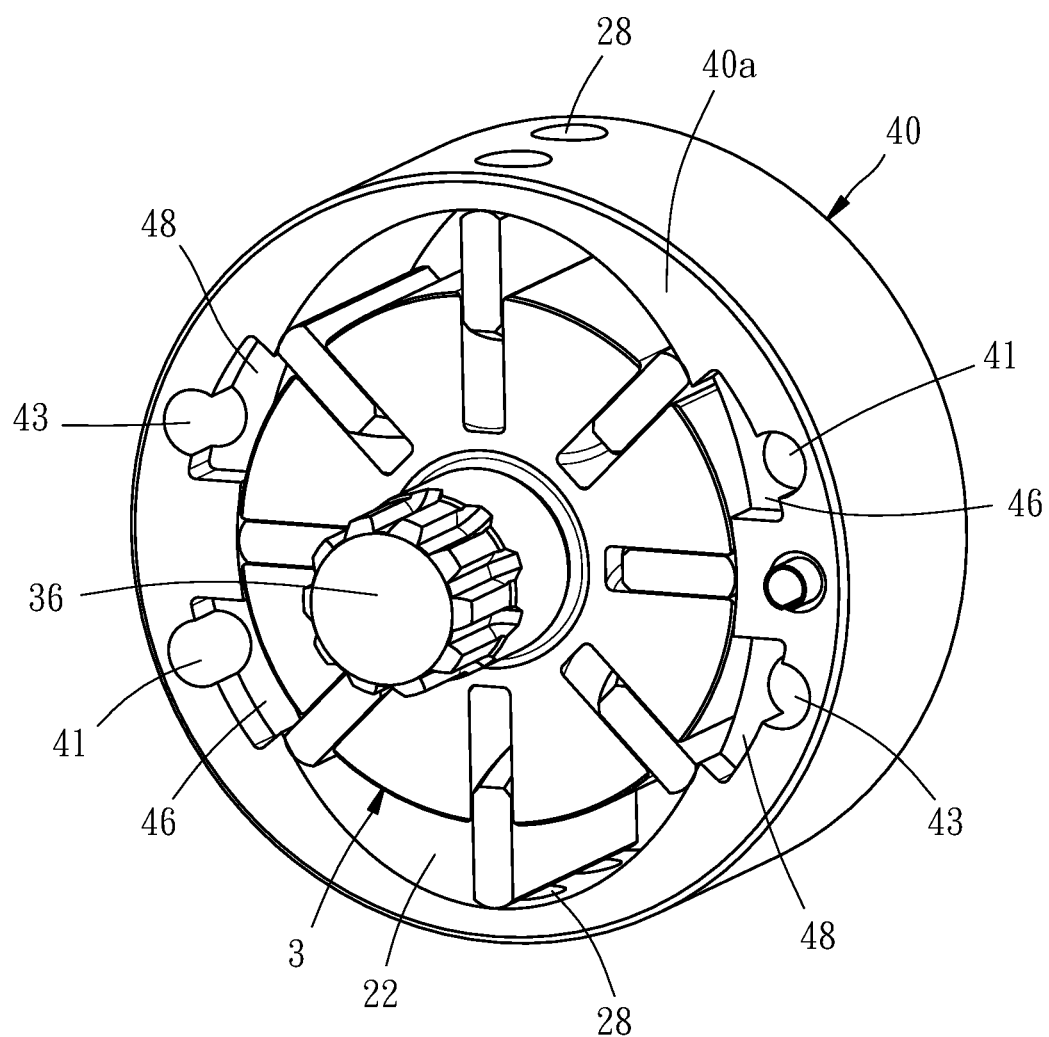

Referring to FIG. 3, the rear cover 60 has two air inlets 62 having an angular orientation difference of 180 degrees therebetween, two air outlets 64 having an angular orientation difference of 180 degrees therebetween, two rear air inletting grooves 66 provided on a front wall of the rear cover 60 and connected with the two air inlets 62 respectively, two rear air venting grooves 68 provided on the front wall of the rear cover 60 and connected with the two air outlets 64 respectively, and a rear axial hole 69. In other potential embodiments, the rear cover 60 and the middle pipe 40 may be formed integrally Referring to FIGS. 4-5, the middle pipe 40 is provided on the rear end 40b thereof with two rear air inletting recesses 42 located correspondingly to the two air inlets 62 and communicating with the accommodating room 22, and two rear air venting recesses 44 located correspondingly to the two air outlets 64 and communicating with the accommodating room 22. The middle pipe 40 further has two air inletting channels 41 penetrating through the middle pipe 40 along an axis X of the cylinder body 20 and connected with the two rear air inletting recesses 42 respectively, two air venting channels 43 penetrating through the middle pipe 40 along the axis X and connected with the two rear air venting recesses 44 respectively, two front air inletting recesses 46 provided on the front end 40a of the middle pipe 40 and connected with the two air inletting channels 41 respectively, and two front air venting recesses 48 provided on the front end 40a of the middle pipe 40 and connected with the two air venting channels 43 respectively. The two front air inletting recesses 46 and the two front air venting recesses 48 all communicate with the accommodating room 22.

Figure 7:
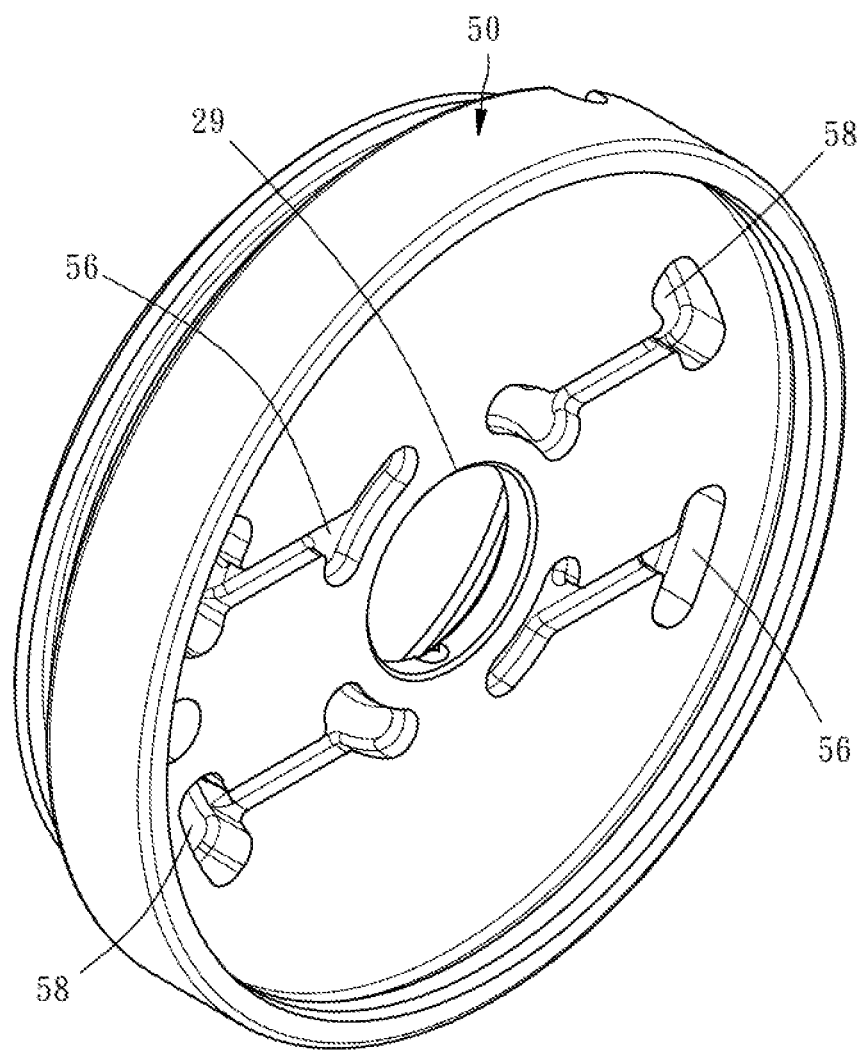
FIG. 7 is a perspective view of a front cover according to the first preferred embodiment of the present invention.

Referring to FIG. 7, the front cover 50 has two front air inletting grooves 56 provided on a rear wall of the front cover 50 and communicating with the two air inletting channels 41 respectively, and two front air venting grooves 58 provided on the rear wall of the front cover 50 and communicating with the two air venting channels 43 respectively. Each of the air inletting paths 24 is composed of one of the air inlets 62, one of the rear air inletting grooves 66, one of the rear air inletting recesses 42, one of the air inletting channels 41, one of the front air inletting recesses 46, and one of the front air inletting grooves 56. Each of the air venting paths 25 is composed of one of the air outlets 64, one of the rear air venting grooves 68, one of the rear air venting recesses 11, one of the air venting channels 43, one of the front air venting recesses 48, and one of the front air venting grooves 58. In other potential embodiments, the front cover 50 and the middle pipe 40 may be formed integrally.

The rotor 30 includes a rotor body 30 rotatable accommodated in the accommodating room 22 of the pneumatic cylinder 2, eight grooves 32 parallel provided on the rotor body 30, eight vanes 34 accommodated in the grooves 32 respectively, a front axle 36 extended from the rotors body 30 frontward and inserted through the front axial hole 29, and a rear axle 38 extended from the rotor body 30 backward and inserted in the rear axial hole 69. The rotor body 30 is abutted against the front cover 50 and the rear cover 60. In other potential embodiments, the amount of the grooves 32 may be modified according to demands; likewise, the amount of the vanes 34 may be modified correspondingly to the grooves 32. The rear axial hole 69 may not penetrate through the rear cover 60. The rear axle 38 is inserted in the rear axial hole 69 for the purpose that the rotor body 30 and the rear cover 60 can be connected more trimly. In fact, the rotor body 30 may have no such rear axle 38; in such condition, the rear cover 60 may have no such rear axial hole 69.

When using the pneumatic tool having the motor 1, such as the pneumatic wrench (not shown), the user can set the pneumatic motor in clockwise rotation or counterclockwise rotation. When air with high pressure (higher than one atmosphere) is guided into the pneumatic cylinder 2, the air enters the accommodating room 22 through the two air inletting paths 24. Specifically speaking, the air firstly passes through the two air inlets 62, and then divided into three parts. One part of the air flows into the accommodating room 22 through the two rear air inletting recesses 42 (hereinafter referred to as flow). Another part of the air eaters the two rear air inletting grooves 66 and then flows into the accommodating room 22 (hereinafter referred to as flow B). The other part of the air enters the two air inletting channels 41 (hereinafter referred to as flow C). When the air of the flow C passes through the two air inletting channels 41, it is divided into two parts. One part of the air flows into the accommodating room 22 through the two front air inletting recesses 46 (hereinafter referred to as flow D). The other part of the air enters the two front air inletting grooves 56 and then flows into the accommodating room 22 (hereinafter referred to as flow E). Wherein, the air of the flow B and the flow F entered the accommodating room 22 blows the vanes 34 to move, causing the vanes 34 to move out from the grooves 32 and abutted against the inner wall of the accommodating room 22. At this time, the air of the flow A and the flow D pushes the extended-out vanes 34 to move, thereby driving the rotor 3 to rotate in the accommodating room 22.

Figure 8:
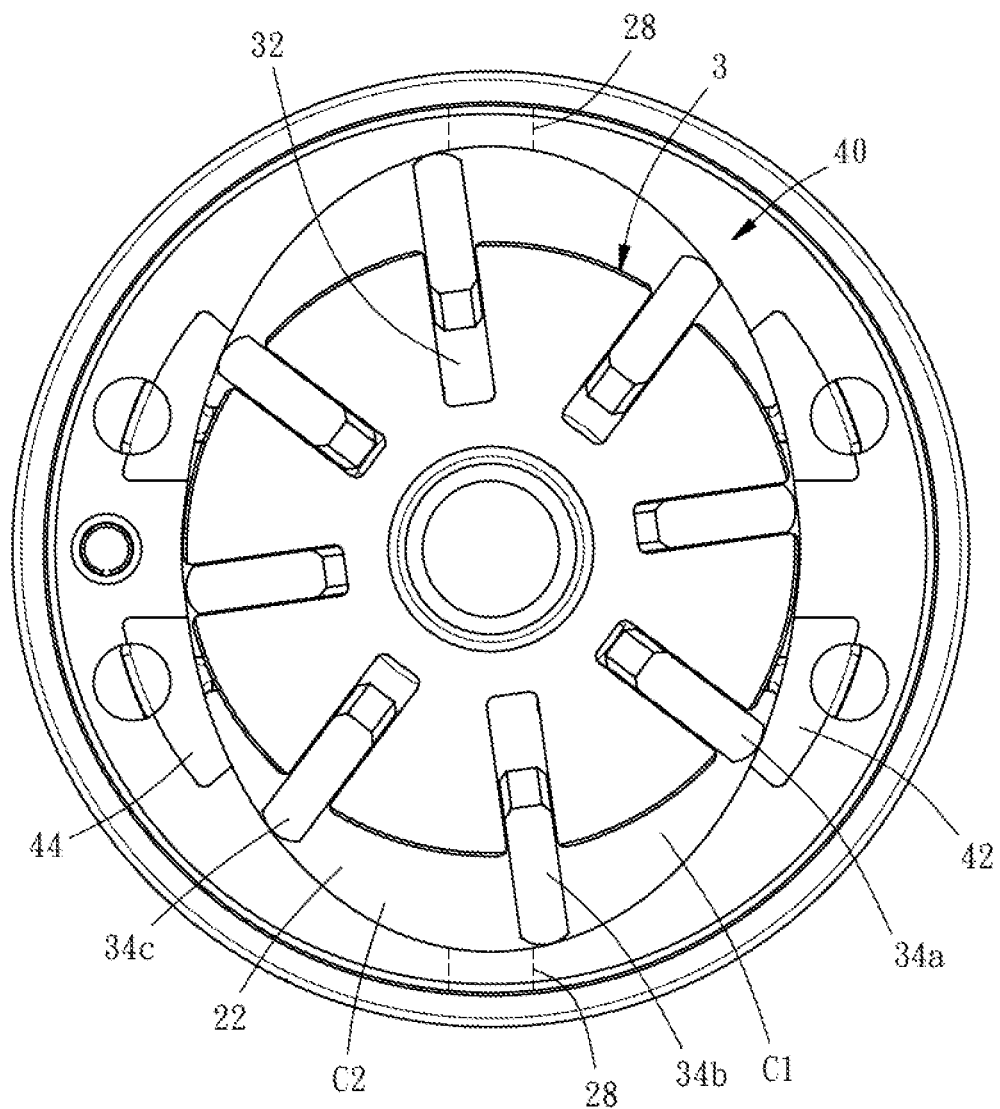
FIGS. 8-10 are schematic views showing the rotation of the rotor according to the first preferred embodiment of the present invention.
Figure 9:
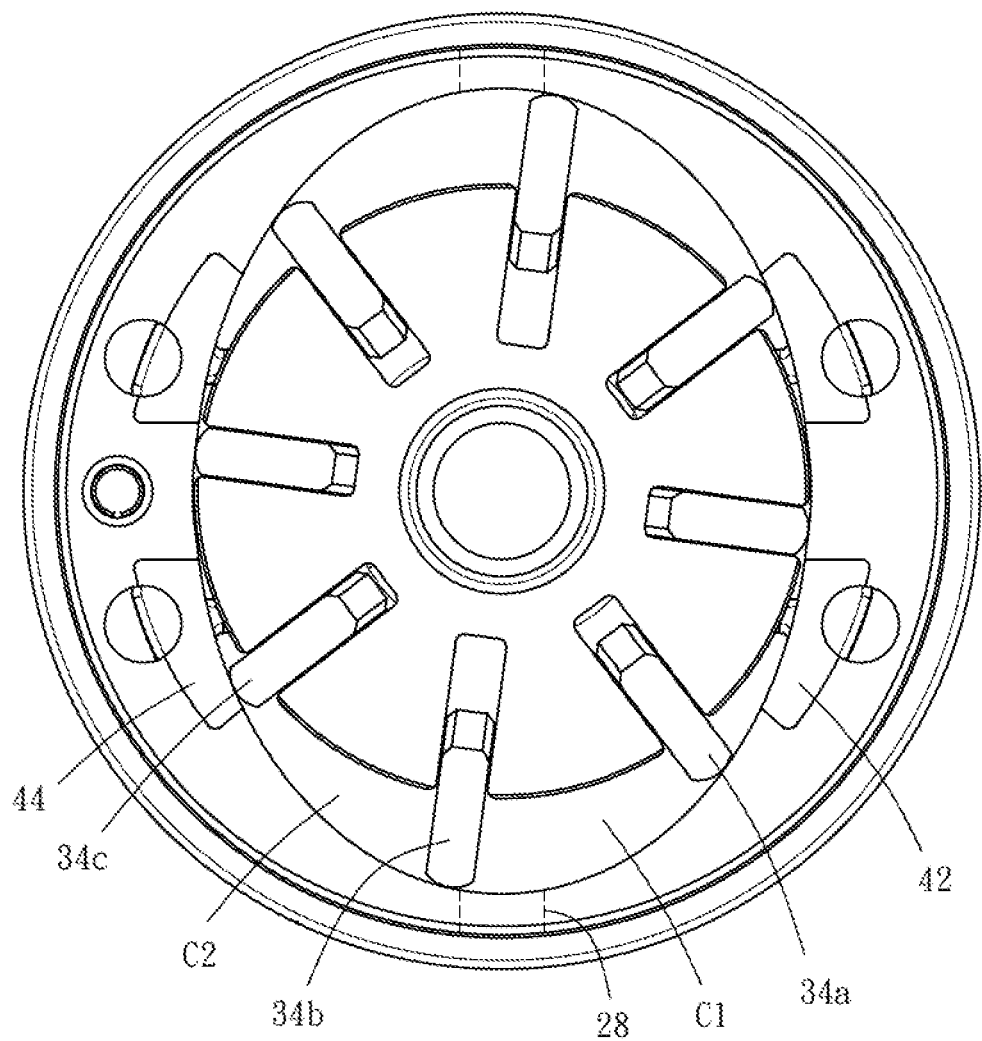
Figure 10:
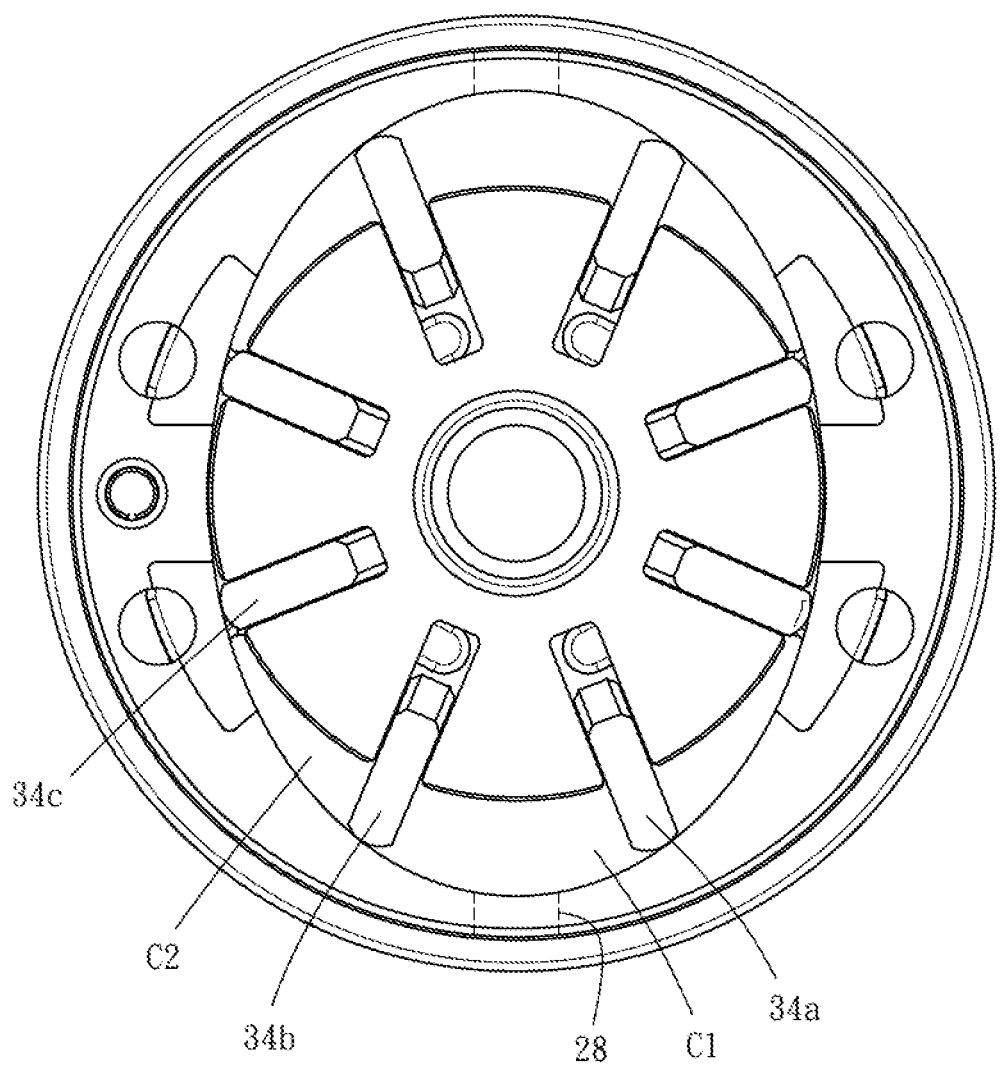

For example, the condition of clockwise rotation is shown in FIG. 8, wherein a part of the accommodating room 22 located between two adjacent vanes 34a and 34b of the aforesaid vanes is defined as a chamber C1, and another part of the accommodating room 22 located between the vane 34b and the vane 34c adjacent to the vane 34b is defined as a chamber C2. When the air with high pressure enters the accommodating room 22 through the two an inletting paths 24, the vane 34a is firstly pushed out from the groove 32 by the air of the flow B and abutted against the inner wall of the accommodating room 22. Meanwhile, the vane 34a is moved by the blowing of the air flowing through the rear air inletting recess 42, i.e. the flow A, so that the rotor 3 starts to rotate clockwise. At this time, the vane 34b doesn't pass the air venting hole 28 yet, and the vane 34c doesn't arrive the rear air venting recess 14. Referring to FIGS. 9-10, during the rotation of the rotor 3, after the vane 34b passes the air venting hole 28, a first air venting process that the air in the chamber C1 is vented through the air venting hole 28 is in progress; at this time, the vane 34c just arrives the rear air venting recess 44, so that a second air venting process that the air in the chamber C2 is vented through the rear air venting recess 44 is in progress. Besides, when the vane 34c is retracted back, the air in the groove 32 is pushed into the rear air venting groove 68; in other words, the air can leave the accommodating room 22 through the two air venting paths 26. In every cycle that the rotor 3 rotates for 360 degrees, the aforesaid air inletting and venting processes all proceed for two times.

The following is the detailed process that the air leaves the accommodating room 22 through the two air venting paths 26. Firstly, the air is partially Vented through the air venting hole 28 in the first air venting process. Then, a part of the air directly enters the venting recess 44 and vented from the air outlet 64, another part of the air enters the rear air venting groove 68 and vented from the air outlet 64, and the other part of the air enters the air venting channel 43 through the front air venting recess 48 and the front air venting groove 58 and then vented from the air outlet 64, so that the second air venting process is accomplished.

It should be specified that when the user sets the pneumatic tool in counterclockwise rotation, the air on the outside can enter the accommodating room 22 through the two air venting paths 26, and the air in the accommodating room 22 can be vented to the outside through the two air inletting paths 24. Tri other words, the function of the two air inletting paths 24 can be exchanged with the function of the two air venting paths 26, depending on the demands of the user.

Because the accommodating room 22 is elliptic-cylinder-shaped, i.e. the cross section thereof is ellipse-shaped, the vanes 34 are extended out from the grooves 32 with relatively more well-distributed speed to arrive the terminal positions, and then retracted back with relatively more well-distributed speed. The vanes 34 are extended and retracted more smoothly and moved forward and backward with more uniform speed, which is different from the prior art that the vanes are extended fast, stopped rushedly and maintained at the terminal positions for a while, and then retracted back to the grooves fast. In the conventional structure, the vanes 34 are relatively more rushed in acceleration and deceleration. In other words, the present invention adjusts the feature of the vanes in the extended and retracted process or the speed-time curve of the forward and backward movement of the vanes by changing the configuration design of the accommodating room, not only causing the motion of the vanes 34 relatively smoother, but also decreasing the friction between the vanes 34 and the inner walls of the grooves 32 so as to decrease the friction of the rotor 3 when it rotates, thereby raising the power output of the motor 1. Meanwhile, the smooth interaction between the elements also lower the vibration of the motor when it works, so that the objective of the present invention is attained. Besides, because the power of the motor 1 is raised, the dealer can manufacture the pneumatic motor with larger torque output than the conventional pneumatic motor under equal volume and weight, or the pneumatic motor with smaller volume and weight than the conventional pneumatic motor under equal torque output, that shows much potential in the market.

In other potential embodiments, the design of the two air inletting paths 24 and the two air venting paths 26 may be modified. For an example, the two air inletting paths 24 and the two air venting paths 26 may be provided on the peripheral wall of the middle pipe 40 and not pass through the front cover 50 or the rear cover 60, as long as the air with high pressure can be guided into the accommodating room 22 to push the rotor 3 to rotate and the air can be vented from the accommodating room 22 after pushing the vanes 34 to move. For another example, each of the air inletting paths 24 may be only composed of one of the air inlets 62, one of the rear air inletting grooves 66 and one of the rear air inletting recesses 42, not including the air inletting channel 41, the front air inletting recess 46 and the front air inletting groove 56; such structure can also attain the purpose of driving the rotation of the pneumatic motor. Alternatively, each of the air venting paths 26 may be only composed of one of the air outlets 64, one of the rear air venting grooves 68 and one of the rear air venting recesses 44, not including the air venting channel 43, the front air venting recess 48 and the front air venting groove 58.

The invention being thus described, it will be obvious that the same may be varied in limy ways. Such variations are not to be regarded as a departure from the spirit and scope of the invention, and all such modifications as would be obvious to one skilled in the art are intended to be included within the scope of the following claims.

What is claimed is:

1. A pneumatic motor with dual air intake comprising:
a pneumatic cylinder comprising a cylinder body, and an accommodating room shaped as an elliptic cylinder and located in the cylinder body, the cylinder body having two air inletting paths, two air venting paths, two air venting holes and a front axial hole, which communicate with the accommodating room and outside; and
a rotor comprising a rotor body rotatably accommodated in the accommodating room of the pneumatic cylinder, a plurality of grooves parallel provided on the rotor body, a plurality of vanes accommodated in the grooves respectively, and a front axle extended from the rotor body and inserted through the front axial hole;
wherein the cylinder body comprises a middle pipe, a front cover connected with a front end of the middle pipe, and a rear cover connected with a rear end of the middle pipe; the front axial hole is provided on the front cover; the two air venting holes are provided on the middle pipe; the rotor body is abutted against the front cover and the rear cover; the rear cover has two air inlets, two air outlets, two rear air inletting grooves provided on a front wall of the rear cover and connected with the two air inlets respectively, and two rear air venting grooves provided on the front wall of the rear cover and connected with the two air outlets respectively; the middle pipe is provided on the rear end thereof with two rear air inletting recesses located correspondingly to the two air inlets and communicating with the accommodating room, and two rear air venting recesses located correspondingly to the two air outlets and communicating with the accommodating room; the two air inletting paths are composed of the two air inlets, the two rear air inletting grooves and the two rear air inletting recesses; the two air venting paths are composed of the two air outlets, the two rear air venting grooves and the two rear air venting recesses;
wherein the middle pipe has two air inletting channels penetrating through the middle pipe along an axis of the cylinder body and connected with the two rear air inletting recesses respectively, two air venting channels penetrating through the middle pipe along the axis and connected with the two rear air venting recesses respectively, two front air inletting recesses provided on the front end of the middle pipe and connected with the two air inletting channels respectively, and two front air venting recesses provided on the front end of the middle pipe and connected with the two air venting channels respectively; the two front air inletting recesses and the two front air venting recesses all communicate with the accommodating room; the front cover has two front air inletting grooves provided on a rear wall of the front cover and communicating with the two air inletting channels respectively, and two front air venting grooves provided on the rear wall of the front cover and communicating with the two air venting channels respectively, each of said two air inletting paths further comprises one of the two air inletting channels, one of the two front air inletting recesses and one of the two front air inletting grooves; each of said two air venting paths further comprises one of the two air venting channels, one of the two front air venting recesses and one of the two front air venting grooves.

2. The pneumatic motor with dual air intake as claimed in claim 1, wherein the front cover and the middle pipe are formed integrally.

3. The pneumatic motor with dual air intake as claimed in claim 1, wherein the rear cover and the middle pipe are formed integrally.

4. The pneumatic motor with dual air intake as claimed in claim 1, wherein the rotor has a rear axle extended from the rotor body; the cylinder body has a rear axial hole wherein the rear axle is inserted.

\* \* \* \* \*